United States Statutory Invention Registration [19]

[11] Reg. Number: H153

Sadler et al.

[43] Published: Nov. 4, 1986

[54] METHOD FOR APPLYING LIQUID TO YARN

[75] Inventors: Donald M. Sadler, Parkside; Harold F. Staunton, Avondale, both of Pa.

[73] Assignee: E. I. Du Pont de Nemours and Company, Wilmington, Del.

[21] Appl. No.: 731,764

[22] Filed: May 8, 1985

Related U.S. Application Data

[63] Continuation of Ser. No. 631,747, Jul. 17, 1984.

[51] Int. Cl.[4] ..... B05D 3/12; B05D 1/02; B05D 7/00; B05D 5/00

[52] U.S. Cl. ..... 427/57; 118/300; 427/421

[58] Field of Search ..... 427/57, 44; 118/300; 239/4, 102; 261/DIG. 48; 68/3

[56] References Cited

U.S. PATENT DOCUMENTS 3,589,854 6/1971 Cobb et al. ..... 8/154

3,591,672 7/1971 Davis et al. ..... 264/167

4,431,684 2/1984 Strohmaier ..... 427/57

*Primary Examiner*—John F. Terapane

*Assistant Examiner*—Eric Jorgensen

[57] ABSTRACT

A method for intermittently applying a liquid to a threadline wherein varying the amplitude of vibration of an atomizing surface of an ultrasonic vibrator is the vehicle for atomizing and propelling the liquid onto a threadline passing in close proximity to the atomizing surface.

6 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR APPLYING LIQUID TO YARN

This application is a continuation, of application Ser. No. 631,747 filed July 17, 1984.

BACKGROUND OF THE INVENTION

This invention relates to the intermittent application of liquids or liquid suspensions to yarns, more particularly, it relates to such application by ultrasonic vibrations conducted above and below an atomization threshold in a regular or irregular fashion.

In the manufacture of textile fibers, the common method of modifying the dyeability of the yarn is by changing the composition of the polymer. This can be done in nylon by changing ratio of standard ingredients or by adding a special additive to the salt before polymerization or injecting certain additives after polymerization.

It is known to modify yarn dyeability by adding additive to the running threadline but this is not the general method of dye modification. Some cases even exist which add modifiers at alternating distances along a threadline. All existing systems have at least two limitations: very short lengths (less than 1 inch in length of about 700 ypm) are not possible and control or change of the pattern to give fully patterned control is not available. This invention allows the pattern to be adjusted instantly and can even give carpet pattern prediction once carpet construction is known.

SUMMARY OF THE INVENTION

This invention relates to the application of dye modification substances or liquid suspensions to a moving threadline, the threadlines being either single monofilament, multifilament bundles or tow; more particularly it involves a method for intermittently applying a liquid to a moving threadline comprising: supplying a liquid in a metered stream to an atomizing surface of an active horn of an ultrasonic vibrator; moving the threadline in a path in close proximity to said atomizing surface; and intermittently atomizing and propelling the liquid onto the yarn by varying the amplitude of vibration of said surface.

It contains the ability to pulse the application of dye modification substances up to 600 Hz at either regular or preferred irregular pulse rates.

The ability to pulse the liquid with an ultrasonic applicator, that would not be possible to the same degree from other applicators, comes from the way atomization is formed with an ultrasonic applicator as disclosed in U.S. Pat. No. 4,431,684. The liquid to be atomized passes through the liquid passage; e.g., 19 in FIG. 2 and forms a layer on the atomizing surface. The ultrasonic vibrations which are normal to this surface cause surface capillary waves in the liquid. Atomization occurs when the amplitude of vibration is high enough to break off the tips of the waves formed, producing droplets of a size governed mostly by the frequency of vibration and, to a lesser extent, by physical properties of the liquid (density, surface tension and viscosity).

Because atomization occurs only when the amplitude of the vibration exceeds a given threshold level for any liquid, it is not necessary to stop ultrasonic vibration of the applicator. Thus intermittent application may be accomplished by causing the applicator vibration amplitude to rapidly alternate above and below the atomization threshold. The liquid that is fed continuously by the metering pump accumulates in the liquid layer on the atomizing surface during the low vibration, or "off", portions of the pulse cycle.

The vibration amplitude alternations have been effected in this case, by driving the applicator's transducer and oscillator with a bilevel switching power supply. This power supply provides alternating drive voltage levels to the oscillator, the lower voltage adjusted to produce a vibration amplitude below the atomization threshold, and the higher voltage above this threshold. Since the applicator tip is continuously vibrating, rapid switching between levels is possible. An additional benefit of the continuous applicator vibrations is that friction, or "snubbing", of the yarn that passes through the applicator tip remains low at all times, thus minimizing yarn nonuniformities that would otherwise result from variable drawing tensions through the applicator itself.

The bilevel switching power supply is controlled by a logic-level signal from a pulse generator. Several pulse generator types may be used, including a conventional function generator for pulses with a regular period, or a preferred random pulse generator to produce pulses with randomly varying "on" and "off" periods. Yarns produced by intermittently applying dye modifiers with a high percent randomness will make carpets with a truly random appearance, i.e., exhibiting neither subtle patterning or "chevroning". Alternatively, a programmed pulse generator may be employed to produce yarn for carpets of any desired pattern, which can be predicted in advance once the carpet construction is known.

Two or more liquids, e.g., finishes or dye modifiers, can be alternately co-applied by employing intermittent ultrasonic applicators in tandem, i.e., closely spaced in series along the moving threadline. The pulse generator that controls the applicators produces a unique pulse train for each applicator that individually and sequentially switches each applicator "on", i.e., into its atomizing mode, in such a manner that the treated segments intermingle along the yarn without overlap. In the case of two tandem applicators alternately applying two different liquids, the two pulse trains from the generator will be complements of one another.

The random pulse generator developed for intermittent finish application is described below, and produces a train of logic pulses that can be randomized on either a pulse rate or a period basis, with percent variability, i.e., randomness, and average pulse repetition rate separately adjustable. Percent variability from 0 to 100% and pulse repetition rates from 4 Hz to 1024 Hz have been incorporated into the design.

As is true with ultrasonic finish applicators in general, the intermittent application of liquids can be performed with applicators vibrating in the range of 10 kHz to 100 kHz, but preferably in the range of 20 kHz to 50 kHz.

DETAILED DESCRIPTION OF THE ILLUSTRATED EMBODIMENTS

Figure 1:
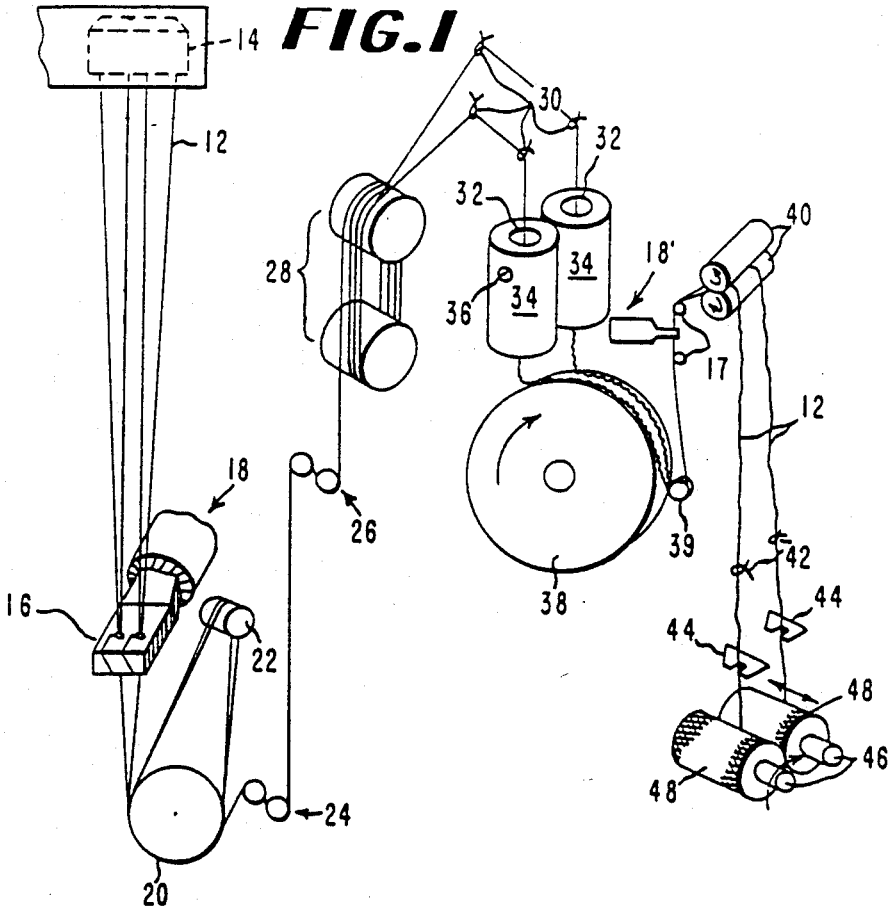
FIG. 1 is a schematic drawing showing use of the subject invention at two locations in a yarn manufacturing operation.

The process chosen for purposes of illustration in FIG. 1 includes a yarn 12 being spun as two separate threadlines from a spinneret 14 and each threadline is forwarded through the passages in the tip of the horn 16 of a first vibrating finish applicator generally designated 18. Next the threadline passes around feed roll 20 and its associated separator roll 22 around draw pin assemblies 24, 26 to draw rolls 28 where it is forwarded by the rolls 28 at a constant speed through yarn guides 30 and through the yarn passageways 32 of the jet bulking devices 34. In the jets 34 the threadlines 12 are subjected to the bulking action of a hot fluid directed through inlets 36 (only one shown). The hot fluid exhausts with the threadline against a rotating drum 38 having a perforated surface on which the yarn cools to set the crimp. From the drum the threadlines in bulky form pass to a guide 39 and continue in a path over a pair of guides 17 past the end of the vibrating applicator 18' then to a pair of driven take-up rolls 40. Bulky yarns of this type are disclosed in U.S. Pat. No. 3,186,155 to Breen and Lauterbach. The threadlines are then directed through fixed guides 42 and traversing guides 44 onto rotating cores 46 to form packages 48.

Figure 2:
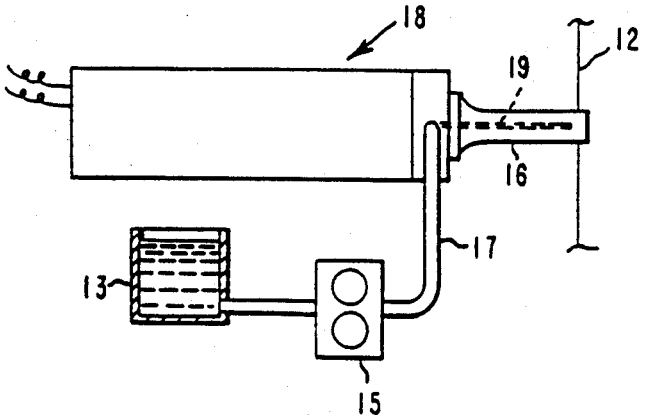
FIG. 2 is a schematic side elevation view of the vibrator used as a finish applicator at a first location.

In FIG. 2 the vibrating finish applicator 18 is supplied with liquid finish by means of a gear pump 15 connected to a reservoir 13. The gear pump supplies a precisely metered stream of liquid finish via pipe 17 to an internal passage 19 in the horn 16. An applicator tip at which the yarn 12 meets the finish is either mounted on the end of or forms an integral part of the horn of the ultrasonic vibrator.

Figure 3:
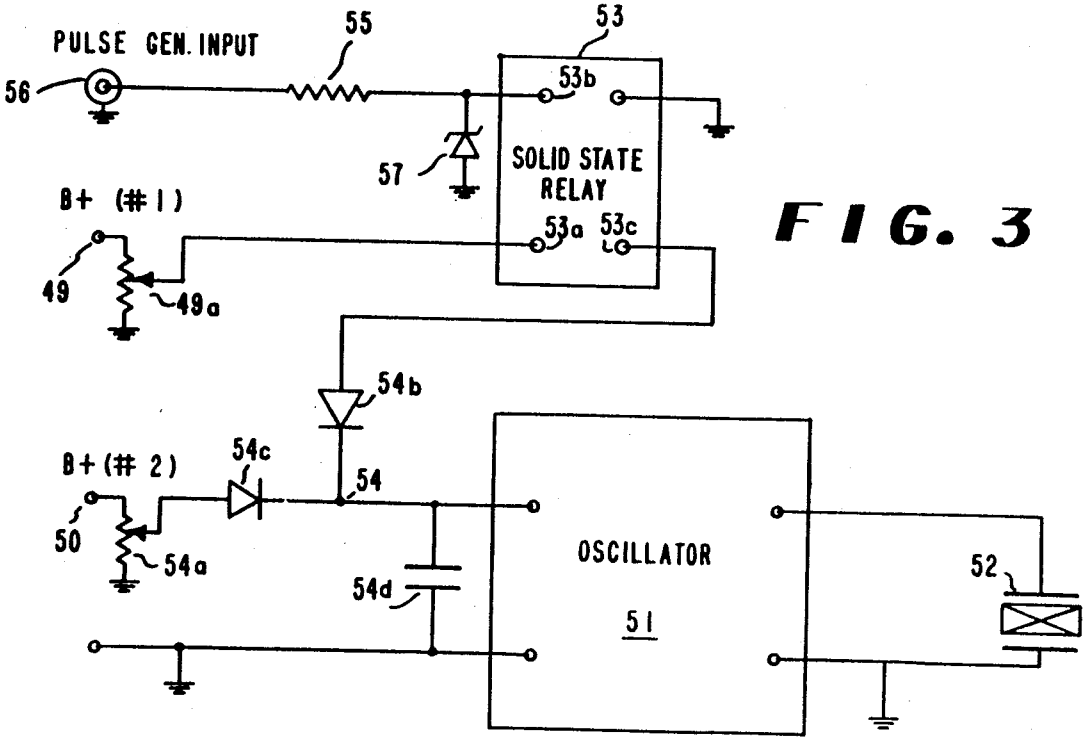
FIG. 3 is a schematic drawing of a bilevel switched power supply for an intermittent ultrasonic applicator.

FIG. 3 is a circuit schematic for a 50 kHz bilevel switched power supply and oscillator for the intermittent ultrasonic applicator. Two separate, adjustable B+ regulated voltage supplies designated 49, 50 alternately provide the drive voltage for a 50 kHz oscillator 51, typically a Branson L—5 "Sonomax" with DC bridge and filter capacitor removed. The oscillator 51 is connected to and drives the ultrasonic transducer and applicator 52. Voltage supply 49, the higher of the two voltage supplies, is adjustable via potentiometer **49*a*, and is input to terminal 53*a* of solid state relay 53. Solid state relay 53, typically a type 603-3 manufactured by Teledyne, is a full on, full off switching device that responds quickly (time constant >100 microseconds) to a logic-level signal that is applied to its control terminal 53*b*. When the relay closes, the voltage from supply 49 appears at output terminal 53*c* and at junction 54 where it overrides the lower B+ voltage supply 50 adjusted via potentiometer 54*a*. Two IN4005 diodes 54*b*, 54*c* conduct the two voltages to junction 54, while isolating the two DC supplies 49, 50 from each other. A 0.1 uF capacitor 54*d*, connecting junction 54 with circuit common at the input terminals of oscillator 51**, provides some DC filtering without markedly reducing the switching times between voltage supply levels.

A logic-level pulse train, typically furnished to terminal 56 by a programmable square wave generator, or a random pulse generator is applied to terminal **53*b* of solid state relay 53 via a 10 ohm limiting resistor 55. A Zener diode 57 serves as an input protection device for the relay 53. The particular signal generator that is selected is dependent upon the repetition frequency, pattern and regularity of the finish application required. With either the random pulse or square wave generator arrangement, the input signal to oscillator 51** can be switched at rates between 4 and 600 Hz (the practical upper limit) with duty cycles ranging between 0 and 100%.

In operation, the DC input to oscillator 51 is a bilevel voltage that varies between two values (rather than full on-full off) to produce a corresponding alternation in the applicator vibration amplitude above and below the atomization threshold levels for a given liquid. Additional benefits gained by pulsing the ultrasonic transducer between two vibration levels, are that oscillator stability is maintained and stresses on both the transducer and power output circuitry are minimized.

The rapid switching speeds attainable with this system sharply define the transition between atomization and nonatomization of the finishing liquid at the applicator tip. As a result, the treated and untreated regions along a threadline moving at 2000 ypm can be well-defined down to one inch lengths.

Figure 4:
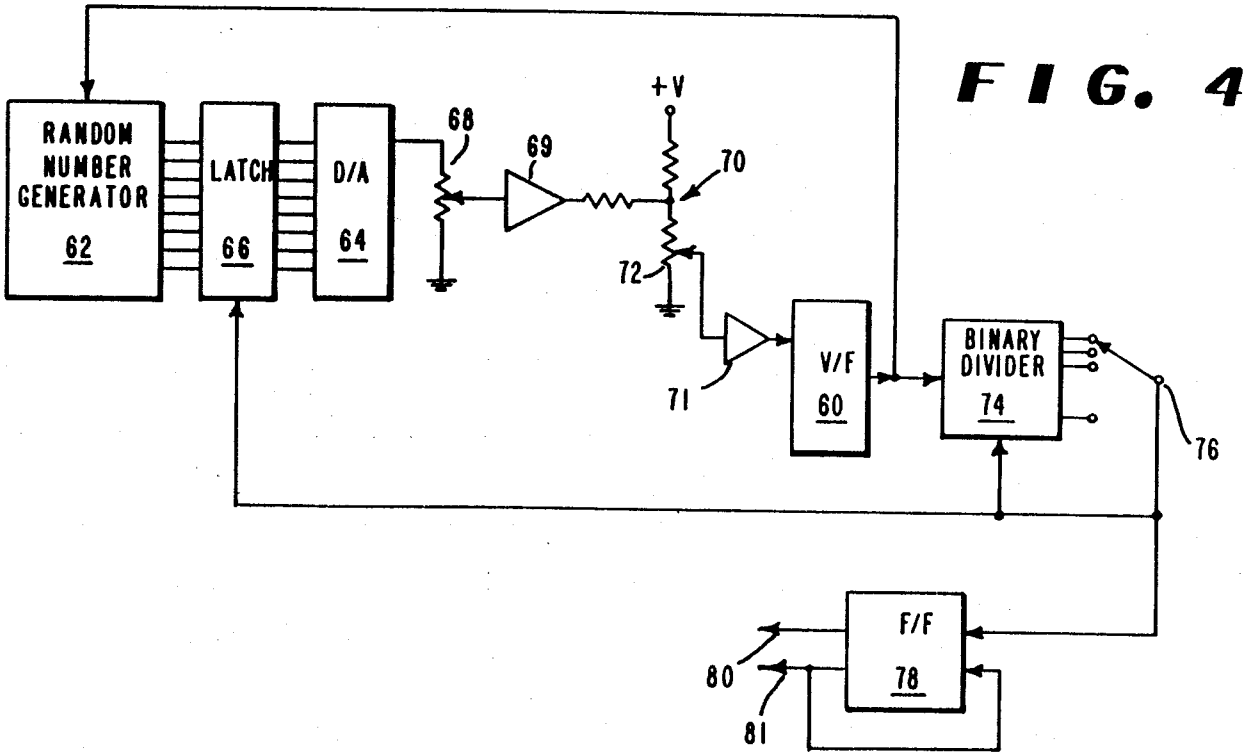
FIG. 4 is a block diagram of a random pulse generator system.

FIG. 4 is the block diagram for a random pulse generator that is capable of randomizing the switching of oscillator 51 between two levels. Although random pulse generators are available on the market, the multimode features of the instant circuit are distinctive in that each is readily selectable from the same circuit. These include:

- Modes 0, 1—Random ON time; fixed (but adjustable) OFF time
- Modes 2, 3—Random OFF time; fixed (but adjustable) ON time
- Modes 4, 5—Random ON time; random OFF time
- Modes 6, 7—Random pulse repetition frequency; fixed (but adjustable) ON/OFF time ratio
- Modes 8, 9—Random ON/OFF time ratio; fixed (but adjustable) pulse repetition frequency.

Controls are provided to set pulse duration, pulse interval, pulse repetition frequency (PRF), and variability (the degree of randomness of either PRF or period).

This generator provides complementary pulse outputs, so that two applicators can be operated in tandem, simultaneously.

The principal component is a voltage-to-frequency (V/F) converter, 60. This device generators a continuous stream of binary-valued pulses at a rate directly proportional to the input voltage. In this case the input voltage comprises the sum of a fixed voltage, which defines an average pulse rate, and a random voltage, which defines the degree of variation of the pulse rate about its average value. The V/F converter 60 is operated so as to produce pulse rates somewhat higher than what is needed at the final system output terminals 80, 81.

The random component of the pulse-rate-determining-voltage is obtained by means of a pseudorandom number generator, 62, coupled to a digital-to-analog (D/A) converter, 64, through a data latch, 66. The D/A converter 64 is configured to produce a bipolar analog voltage which varies in proportion to the size of the digital word input to it via the latch, 66. The D/A converter 64 uses offset binary decoding, i.e., the most significant bit of the digital word determines the polarity of the voltage, and the remaining bits determine the voltage magnitude. The bipolar voltages produced by this part of the circuit are random from one sample to the next, and the probability of occurrence of any voltage in the range of the D/A converter is equal to any other. Statistically, the voltage samples are randomly and uniformly distributed between fixed limits with a zero average value.

The degree to which the final input to the V/F converter 60 contains a random component is determined by the setting of potentiometer 68. The fixed component contribution is scaled by a resistive mixing network such that at network node 70, the fixed voltage and the maximum random voltage have equal weight. This allows potentiometer 68 to be calibrated in percent variability about the average. Potentiometer 72 permits one to vary the mixture of fixed and random components over a 2:1 range, while maintaining unchanged the ratio of these components as defined by the setting of potentiometer 68.

Because the pulse generator's final output must cover a wide range of pulse rates, the system is designed to make available a selection of fixed ranges to provide a coarse pulse-rate control, and means to interpolate within each range to provide a fine control. To accomplish this, the output of the V/F converter 60 is input to a binary divider, 74, which provides outputs for each divisor stage. Switch 76 selects the approximate pulse rate desired. Since succeeding divider outputs differ by a factor of two from one another, and the nonrandom voltage input to the V/F converter 60 can be varied over a 2:1 range by potentiometer 72, the circuit will produce the desired result of continuous pulse rate adjustment over a wide range. The undivided pulses from the V/F converter 60 also are used as a convenient clock for the random number generator 62, which at each clock pulse produces a new random number.

Each half-cycle of the final output pulse period is generated independently, i.e., the "on" time and "off" time durations are separately determined for each cycle. When the number of output pulses from the V/F converter 60 equals that selected by switch 76, the binary divider 74, output will change from a logic level 0 to a logic level 1. This signal then starts the next half-cycle of the output pulse by toggling flip-flop 78 and resetting the binary divider 74. The transition also triggers latch 66 to sample the next random number whose analog voltage value, attenuated by potentiometer 68, is added to a fixed voltage at junction 70, via buffer 69. It is the voltage at junction 70, after modification by potentiometer 72 and isolation by buffer 71 that instantaneously determines the pulse rate at the output of the V/F converter 60. This pulse rate remains constant for the instant half-cycle. When the binary divider 74 output signal changes to a logic 1 at the pole of switch 76, the procedure described above is repeated.

For purposes of simple explanation, FIG. 4 represents only one of several operating modes of the random pulse generator. In fact, the flip-flow 78 outputs and the binary divider 74 reset pulses are input to a mode controlling network, which operates latch 66 and other subcircuits (not shown). In particular, FIG. 4 shows the option of obtaining output pulses having, on the average, a 50% on-off duty cycle with selectable pulse rate and percent variability independently applied to each portion of the cycle. The random pulse output can be obtained from either or both outputs 80, 81 of flip-flop 78, the two outputs being the complements of one another.

In plant test runs, yarns that have been treated with an intermittent ultrasonic applicator, using average pulse repetition rates of 12 Hz to 500 Hz, have exhibited dyed lengths of 33 in. (84 cm) down to 0.8 in. (2.0 cm) for bulked continuous filament yarn wound at 2000 ypm (1827 m/min). Above 600 Hz, the inertia of the ultrasonic applicator and transducer begins to override the power supply switching with the result that atomization becomes continuous.

EXAMPLE I

Polyhexamethylene adipamide having a relative viscosity of about 63 and 75 amine-end groups and micro equivalents per gram of polymer (equivalents per $10^6$ grams of polymer) is melt spun into a yarn containing 136 filaments and processed using apparatus similar to that shown in FIGS. 1–4 except only the first of the applicators (18) shown is used. Either location works equally well for application of dye modifiers. The spun filaments are passed through the tip of an ultrasonic finish applicator operating at 50 kHz and pulsing at 150 Hz at 100% random variability. A dye resist chemical mixed with a yarn finish is atomized and propelled onto the spun yarn. The yarn is then forwarded to a feed roll running at a surface speed of 680 yards (624 meters) per minute. The applicator has the configuration shown in FIG. 1. The dye resist chemical (N-acetyl-succinimide) produces lighter dyeing sections randomly distributed along the threadline. Table 1 lists the lengths of the yarn treated showing lengths of 0.5 inches (1.3 cm) to 10.5 inches (26.7 cm). This length variability and random distribution cannot be duplicated by any other known method on a threadline traveling at 680 ypm (624 meters/min.).

Yarns were run more than 4 hours without a threadline break, showing that on-line dye modification performs as well as the standard process.

The treated yarn was then drawn to a denier of 1350 by draw rolls running at a surface speed of 2154 ypm (1976 meters/min.), then bulked and wound up. This yarn was tufted into a carpet, then dyed. Only carpets with tone-on-tone coloration were produced using this dye modifier, but it is expected that cationic and other modifiers can be found which will allow production of yarns for carpets of any color combination desired.

TABLE 1

Measurement of length of dye resist applied along threadline as per Example I ultrasonic pulser set at 150 Hz and 100% variability. Measurements are made in inches on a 70 foot length of yarn sample.

| | | | | | |
|---|---|---|---|---|---|
| 1.5 | 5.00 | 3.50 | 2.00 | 1.50 | 2.50 |
| 4.0 | 3.00 | 4.50 | 6.50 | 5.50 | 5.50 |
| 1.0 | 1.00 | 3.00 | 2.00 | 3.00 | 2.00 |
| 1.25 | 2.00 | 3.00 | 3.00 | 4.00 | 3.00 |
| 1.00 | 2.00 | 8.00 | 4.50 | 4.50 | 2.50 |
| 3.50 | 3.50 | 4.00 | 3.50 | 2.25 | |
| .50 | 3.00 | 3.00 | 5.00 | 1.00 | |
| .50 | 1.00 | 3.00 | 4.00 | 4.25 | |
| 5.50 | 2.00 | 10.00 | 1.00 | 2.50 | |
| 4.00 | 3.00 | 6.00 | 5.00 | 4.50 | |
| 4.00 | 10.00 | 10.50 | 3.00 | 2.00 | |
| 4.00 | 3.00 | 3.00 | 5.00 | 4.00 | |
| 2.50 | 4.50 | 3.50 | 1.50 | 9.00 | |
| 2.00 | 8.00 | 4.50 | 2.50 | 1.00 | |
| 2.50 | 8.00 | 3.50 | 4.00 | 5.00 | |
| 1.00 | 1.00 | 1.00 | 4.00 | 2.00 | |
| 3.00 | 5.00 | 1.50 | 5.50 | 2.50 | |
| 2.00 | 6.00 | 2.50 | 6.00 | 1.00 | |
| 4.50 | 2.00 | 10.00 | 5.00 | 1.00 | |
| 2.00 | 9.50 | 4.00 | 3.00 | 4.00 | |
| 5.00 | 5.00 | 7.00 | 1.00 | 2.00 | |
| 5.00 | 10.50 | 7.00 | 1.50 | 4.50 | |
| 3.00 | 1.00 | 1.50 | 6.00 | 9.50 | |
| 5.00 | 3.00 | 2.00 | 2.00 | 2.50 | |

EXAMPLE 2

A 1350 denier yarn is prepared in a manner similar to that described in Example 1 except antisoil finish is applied as a primary finish at the first location 18 and the dye modifier is added at the bulking drum location 18'. The process runs well and dye patterns similar to those of Example 1 result on the final carpet.

We claim:

1. A method for intermittently applying a liquid to a moving threadline comprising: supplying a liquid in a metered stream to a continuously vibrating atomizing surface of an active horn of an ultrasonic vibrator, said liquid having a threshold level of vibration amplitude for atomizing said liquid; moving the threadline in a path in close proximity to said atomizing surface; and intermittently atomizing and propelling the liquid onto the yarn by using bilevel excitation of the horn to vary the amplitude of vibration of said continuously vibrating atomizing surface above and below said threshold level thereby adding liquid to said threadline intermittently to produce liquid treated and untreated regions along the threadline.

2. The method as defined in claim 1, said amplitude being varied at the rate of from about 12 to about 500 Hz, said threadline moving at speeds up to 2000 yards per minute.

3. The method of claim 1, wherein varying the amplitude of vibration of said surface is periodic.

4. The method of claim 1, wherein varying the amplitude of vibration of said surface is random.

5. The method of claim 1, wherein varying the amplitude of vibration of said surface is in a programmed manner.

6. The method of claim 1, wherein at least two ultrasonic vibrators are employed closely spaced in series along the moving threadline.

* * * * *